US012674770B2

(12) United States Patent (10) Patent No.: US 12,674,770 B2
Hiroi et al. (45) Date of Patent: Jul. 7, 2026

(54) INSPECTION DEVICE AND INSPECTION METHOD

(71) Applicant: Hitachi High-Tech Corporation, Tokyo (JP)

(72) Inventors: Takashi Hiroi, Tokyo (JP); Yuko Otani, Tokyo (JP); Yuya Isomae, Tokyo (JP); Muneyuki Fukuda, Tokyo (JP); Masakazu Kanezawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 439 days.

(21) Appl. No.: 18/569,860

(22) PCT Filed: Jul. 28, 2021

(86) PCT No.: PCT/JP2021/027871
§ 371 (c)(1),
(2) Date: Dec. 13, 2023

(87) PCT Pub. No.: WO2023/007607
PCT Pub. Date: Feb. 2, 2023

(65) Prior Publication Data
US 2024/0280520 A1 Aug. 22, 2024

(51) Int. Cl.
*G01N 23/2251* (2018.01)
(52) U.S. Cl.
CPC ... *G01N 23/2251* (2013.01); *G01N 2223/401* (2013.01); *G01N 2223/6116* (2013.01)
(58) Field of Classification Search
CPC ......... G01N 23/2251; G01N 2223/401; G01N 2223/6116
See application file for complete search history.

(56) References Cited

U.S. PATENT DOCUMENTS 8,035,082 B2 * 10/2011 Yamazaki .......... G01N 23/2251
250/396 ML
11,353,413 B2 * 6/2022 Song ...................... H01J 37/28
(Continued)

FOREIGN PATENT DOCUMENTS

JP 2004-170395 A 6/2004
JP 2020-177835 A 10/2020
(Continued)

OTHER PUBLICATIONS

International Search Report (PCT/ISA/210) issued in PCT Application No. PCT/JP2021/027871 dated Sep. 21, 2021 with English translation (4 pages).
(Continued)

*Primary Examiner* — Sean Luck
(74) *Attorney, Agent, or Firm* — Crowell & Moring LLP

(57) ABSTRACT

The purpose of the present disclosure is to provide a technology which enables, in a step for analyzing a defect of an element, identification of the position of the defect even in a case where the defect is thin or there is an influence of contamination. An inspection apparatus according to the present disclosure irradiates a first region including a defect of a sample with a low-energy first electron beam and then generates a second electron beam image obtained by irradiating a second region including the first region with a high-energy second electron beam, and identifies the position of the first region in the second electron beam image, thereby identifying the position of the defect.

12 Claims, 10 Drawing Sheets

(56)　　　　　　References Cited

U.S. PATENT DOCUMENTS

| | | |
|---|---|---|
| 2004/0129879 A1 | 7/2004 | Furiki et al. |
| 2015/0348750 A1 | 12/2015 | Obara et al. |
| 2020/0004138 A1 | 1/2020 | Budach et al. |
| 2020/0335300 A1 | 10/2020 | Ito et al. |
| 2021/0088917 A1 | 3/2021 | Tabery et al. |
| 2022/0068590 A1 | 3/2022 | Luo et al. |

FOREIGN PATENT DOCUMENTS

| | | |
|---|---|---|
| TW | 201432253 A | 8/2014 |
| TW | 201841192 A | 11/2018 |
| TW | 201928528 A | 7/2019 |
| TW | 202032611 A | 9/2020 |

OTHER PUBLICATIONS

Japanese-language Written Opinion (PCT/ISA/237) issued in PCT Application No. PCT/JP2021/027871 dated Sep. 21, 2021 with English translation (5 pages).
Chinese-language Office Action issued in Taiwanese Application No. 111127686 dated Mar. 3, 2023 4 pages.

* cited by examiner

FIG. 10

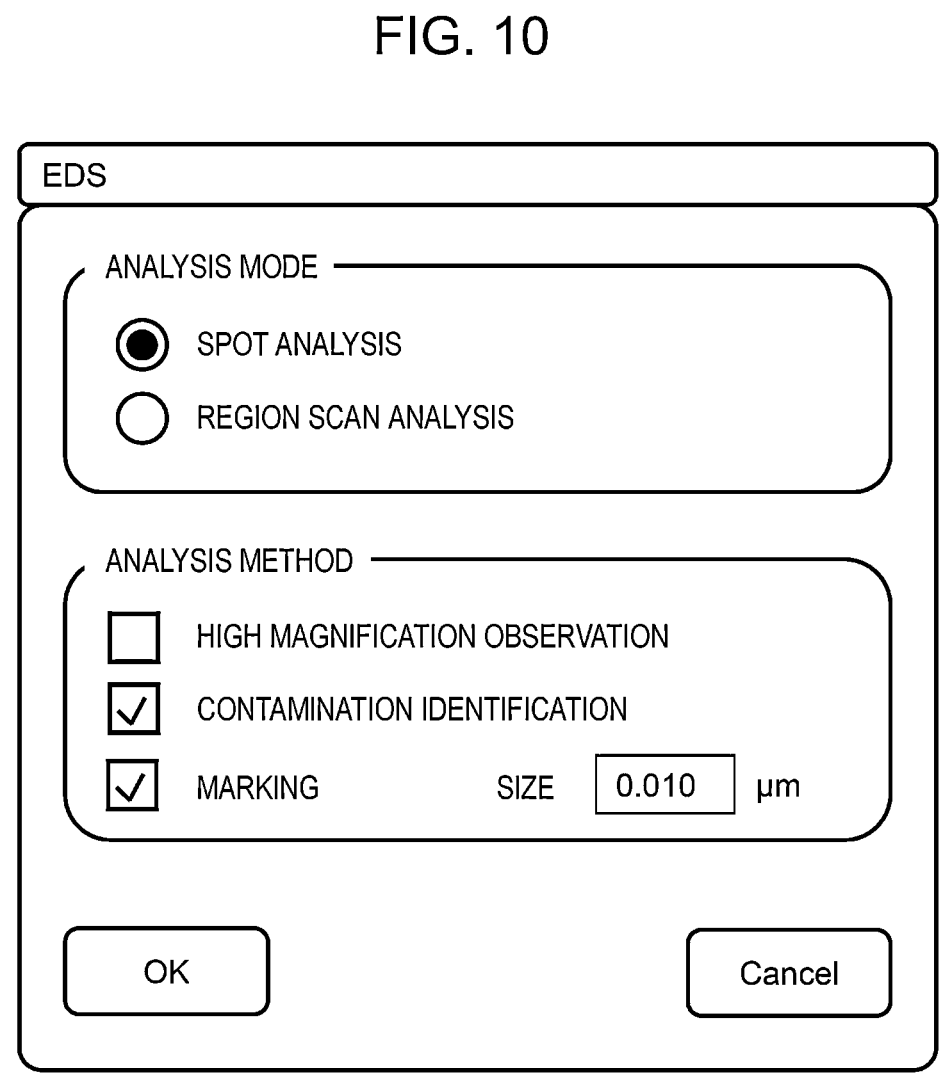

EDS

ANALYSIS MODE

⦿ SPOT ANALYSIS

○ REGION SCAN ANALYSIS

ANALYSIS METHOD

☐ HIGH MAGNIFICATION OBSERVATION

☑ CONTAMINATION IDENTIFICATION

☑ MARKING     SIZE   0.010   μm

OK          Cancel

INSPECTION DEVICE AND INSPECTION METHOD

TECHNICAL FIELD

The present disclosure relates to an inspection apparatus that inspects a defect of a sample using an image obtained by irradiating the sample with an electron beam.

BACKGROUND ART

As a technique for inspecting a pattern formed on a semiconductor wafer, an apparatus that irradiates the sample with a charged particle beam such as an electron beam is used in some cases. Below, a case where the electron beam is used is described as an example. When the sample is irradiated with the electron beam, secondary particles are generated from the sample, and an observation image of the sample can be generated by forming pixel values using signal intensity of the secondary particles.

Even a semiconductor wafer (or bare wafer) on which no pattern is formed may be inspected for the presence of the defect using a similar method. When the defect is found, the origin of the defect can be clarified by analyzing an element of the defect by energy dispersive X-ray spectroscopy (EDS) analysis or the like. Information regarding the origin of this defect is considered important for improving manufacturing yield.

PTL 1 describes an EDS analysis method for a wafer having a pattern. In PTL 1, a relative relationship of a defect position to a pattern position is determined under conditions where both the pattern and the defect can be observed, the pattern position is specified using optical conditions for EDS analysis in which only the pattern can be observed, and the defect position is specified as a relative position from that position.

CITATION LIST

Patent Literature

PTL 1: JP2020-177835A

SUMMARY OF INVENTION

Technical Problem

In the EDS analysis, the electron beam is emitted at a relatively high acceleration voltage. When the same optical conditions are used to acquire an observation image of the sample, the observation image is acquired by irradiating the sample with the electron beam using the high acceleration voltage. When using such a high acceleration voltage, since a thin defect such as "stain" transmits the electron beam, it is difficult to specify the defect position.

As a step before analyzing the element of the defect by EDS, the observation image of the sample may be obtained by irradiating the sample with the electron beam at a low acceleration voltage in order to specify the defect position. Due to the influence of the emitted electron beam at this time, so-called contamination, such as carbon adhering to a sample surface, may occur. When performing the EDS analysis, it is necessary to specify the defect position again due to an accuracy of a stage and an optic axis of an optical system, but because this contamination remains, it may be difficult to specify the defect position during the EDS analysis. This is because the contamination overlaps with the defect on the observation image and the defect position cannot be clearly identified.

In a conventional EDS analysis method such as that disclosed in PTL 1, the thin defect and the influence of contamination are not sufficiently considered, and a technique that can specify these defect positions in the EDS analysis is desired.

The present disclosure has been made in view of the problems described above, and an object thereof is to provide a technique that can specify the position of the defect in a process of analyzing the element of the defect even when there is the thin defect or the influence of contamination.

Solution to Problem

An inspection apparatus according to the present disclosure irradiates a first region including a defect of a sample with a low-energy first electron beam and then generates a second electron beam image obtained by irradiating a second region including the first region with a high-energy second electron beam, and specifies a position of the first region in the second electron beam image, thereby specifying a position of the defect.

Advantageous Effects of Invention

According to the inspection apparatus according to the present disclosure, even when there is the thin defect or the influence of contamination, the position of the defect can be specified in the process of analyzing the element of the defect. Other problems, configurations, advantages, and the like of the present disclosure will become clear from the description of the embodiments below.

BRIEF DESCRIPTION OF DRAWINGS

FIG. 10 illustrates an example of a user interface presented by the computer system 13 in Embodiment 2.

DESCRIPTION OF EMBODIMENTS

Embodiment 1

Figure 1:
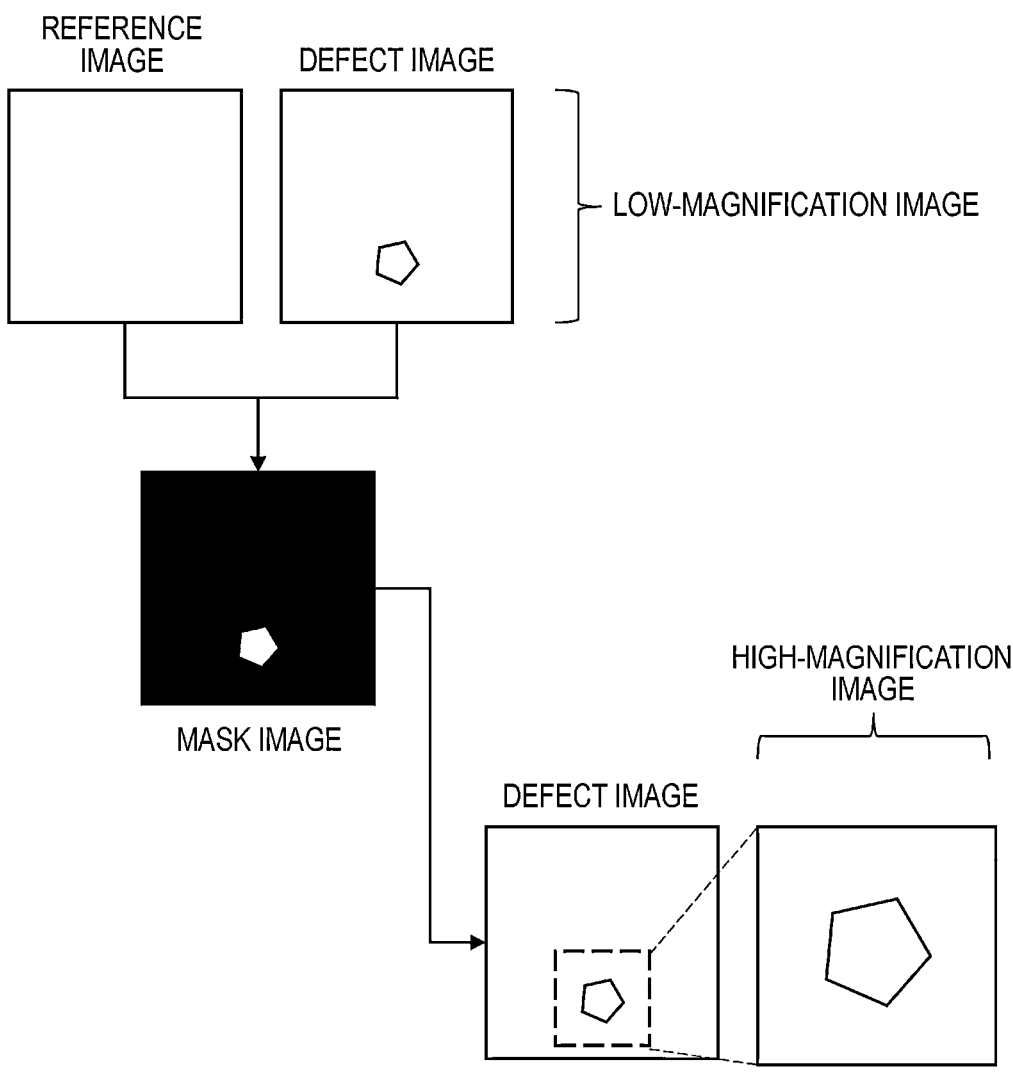
FIG. 1 is a schematic diagram illustrating a general procedure for specifying a defect position using an observation image obtained by irradiating a sample with an electron beam.

FIG. 1 is a schematic diagram illustrating a general procedure for specifying a defect position using an observation image obtained by irradiating a sample with an electron beam. First, the observation image (defect image) near a defect is acquired at low magnification, and a mask image is generated by comparing the observation image with a reference image without the defect. In the mask image, the center of a region (white region on the drawing) having a pixel value different from that of a background portion is specified as a defect position. Furthermore, a high magnification observation image may be generated around the defect position. A size of a high magnification observation region can be, for example, about twice a defect size specified on the mask image. An EDS analysis is performed on the specified defect position.

Figure 2A:
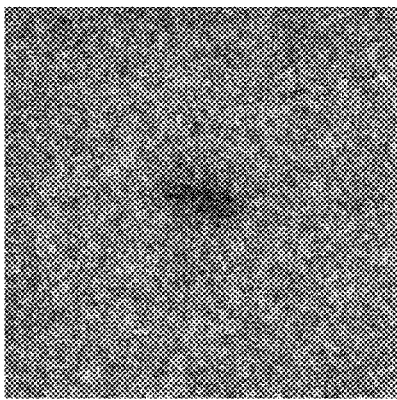
FIG. 2A illustrates an example of an observation image when it is difficult to specify the defect position in an EDS analysis.

FIG. 2A is an example of the observation image when it is difficult to specify the defect position in the EDS analysis. The observation conditions include an acceleration voltage of 500 eV, a beam current of 400 pA, and an FOV size of 0.5 μm. Under these observation conditions, a defect in the shape of a "stain" can be visually recognized in the center of the image. On the other hand, in the EDS analysis, the electron beam may be emitted at a relatively high acceleration voltage. At such a high acceleration voltage, the electron beam is transmitted through a thin defect in the shape of the "stain" in the center of FIG. 2A, and thus it is difficult to properly obtain an observation image of the defect. Therefore, it becomes difficult to specify the defect position when performing the EDS analysis.

Figure 2B:
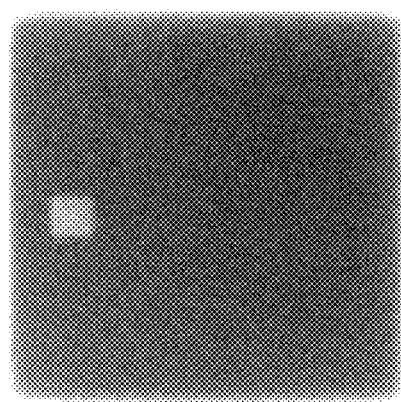
FIG. 2B illustrates an example of an observation image of contamination caused by irradiating the sample with the electron beam.

FIG. 2B is an example of an observation image of contamination caused by irradiating the sample with the electron beam. The observation conditions include an acceleration voltage of 3 keV, a beam current of 800 pA, and an FOV size of 6 μm. In a defect observation process, the observation region is irradiated with the electron beam in order to obtain the observation image of the defect. This may cause contamination. The white rectangular region on the left side of the drawing represents a region where contamination has occurred.

Figure 2C:
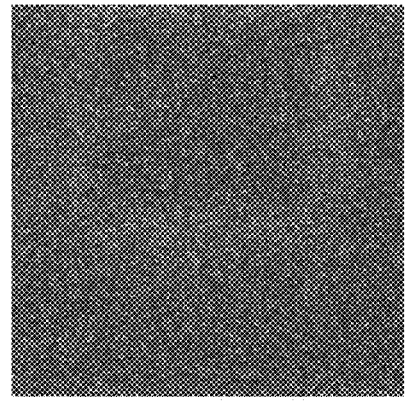
FIG. 2C illustrates an example of a high magnification observation image in a contamination region of FIG. 2B.

FIG. 2C is an example of a high magnification observation image in the contamination region of FIG. 2B. The observation conditions include an acceleration voltage of 3 keV, a beam current of 800 pA, and an FOV size of 1 μm. Due to the influence of contamination, a defect that would originally exist cannot be visually recognized on the observation image. That is, this example shows that irradiation with an electron beam in advance in order to specify the defect position during the EDS analysis may actually make it difficult to specify the defect position.

Figure 3:
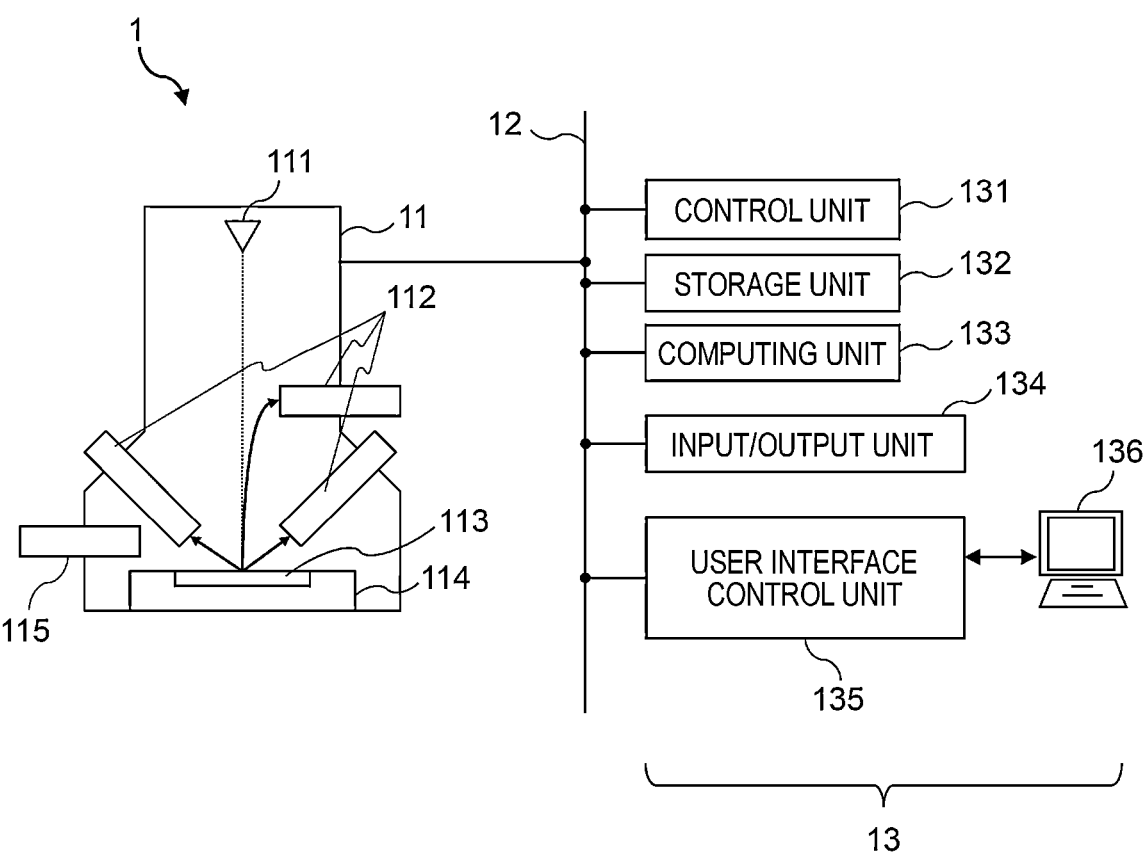
FIG. 3 is a configuration diagram of an inspection apparatus 1 according to Embodiment 1.

FIG. 3 is a configuration diagram of an inspection apparatus 1 according to Embodiment 1 of the present disclosure. The inspection apparatus 1 is an apparatus that inspects a defect of a sample 113 by irradiating the sample 113 with a charged particle beam (electron beam as an example in Embodiment 1). The inspection apparatus 1 includes a charged particle beam device 11, a communication line 12, and a computer system 13.

The charged particle beam device 11 includes an electron source 111, a detector 112, a stage 114, an EDS detector 115, and the like. The sample 113 (for example, a semiconductor wafer or bare wafer on which no pattern is formed) is placed on the stage 114. When the electron beam emitted by the electron source 111 hits the sample 113, secondary particles (secondary electrons and backscattered electrons) are generated. The detector 112 detects the secondary particles and outputs a detection signal representing their intensity. The computer system 13 receives the detection signal via the communication line 12 and uses the detection signal to generate an observation image of the sample 113. The EDS detector 115 detects an EDS signal generated from the sample 113 when performing the EDS analysis on the sample 113, and outputs a detection signal representing the detection result. The computer system 13 receives the detection signal via the communication line 12 and performs the EDS analysis using the detection signal.

The computer system 13 includes a control unit 131, a storage unit 132, a computing unit 133, an input/output unit 134, a user interface control unit 135, and an operation terminal 136. The control unit 131 controls each unit included in the charged particle beam device 11. The storage unit 132 stores data used by the computer system 13. The computing unit 133 generates the observation image of the sample 113 using the detection signal output by the detector 112. In addition, the computing unit 133 performs an inspection procedure that will be described later. The input/output unit 134 controls input/output of data. The user interface control unit 135 generates a user interface, which will be described later, and displays the user interface on a screen on the operation terminal 136. The operation terminal 136 is a terminal for inputting an instruction given to the computer system 13 (or the charged particle beam device 11 via the computer system 13) by a user.

Figure 4:
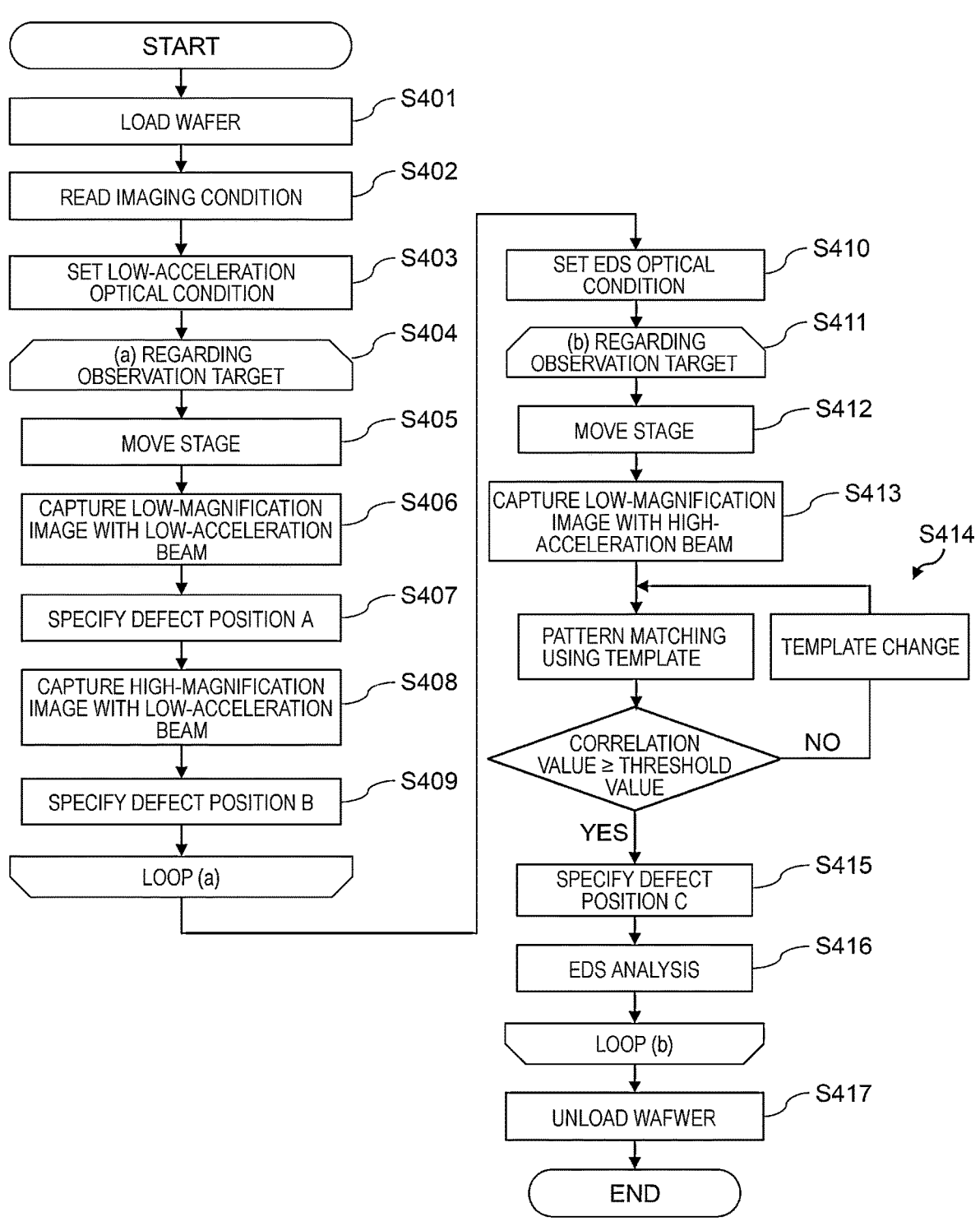
FIG. 4 is a flowchart illustrating a procedure in which the inspection apparatus 1 inspects a sample 113.

FIG. 4 is a flowchart illustrating the procedure in which the inspection apparatus 1 inspects the sample 113. Each step in FIG. 4 is described below.

(FIG. 4: Steps S401 to S404)

The sample 113 is loaded into the charged particle beam device 11 (S401). The control unit 131 reads imaging conditions from the storage unit 132 (S402). The control unit 131 sets optical conditions for accelerating the electron beam at a low acceleration voltage for each part of the charged particle beam device 11, such as an optical system (S403). The following steps S405 to S409 are performed for each observation target (defect position on the sample 113) (S404). A position and shape of the observation target may be acquired, for example, by taking over from a result in the previous process.

(FIG. 4: Steps S405 to S409)

The control unit 131 moves the stage 114 to an inspection position (S405). The control unit 131 irradiates the sample 113 with the electron beam at the low acceleration voltage, and the computing unit 133 generates a low magnification observation image (S406). The computing unit 133 specifies a rough defect position (referred to as defect position A) from the low magnification observation image (S407). The control unit 131 irradiates the sample 113 with the electron beam at the low acceleration voltage, and the computing unit 133 generates a high magnification observation image around the defect position A (S408). The computing unit 133 specifies a more precise defect position (referred to as defect position B) on the high magnification observation image (S409). Any known technique can be used as a method for specifying the defect position in S407 and S409 (for example, the method described in FIG. 1). A specific example of S409 will be described later.

(FIG. 4: Steps S410 and S411)

The control unit 131 sets optical conditions (acceleration voltage is higher than that of S403) for performing the EDS analysis for each part of the charged particle beam device 11 (S410). The following steps S405 to S416 are performed for each observation target (observation position on the sample 113) (S411).

(FIG. 4: Steps S412 to S416)

The control unit 131 moves the stage 114 to the inspection position (S412). The control unit 131 irradiates the sample 113 with the electron beam at a high acceleration voltage, and the computing unit 133 generates a low magnification observation image (S413). The computing unit 133 performs pattern matching using a template to be described later (S414). Similar template matching is repeated while changing the template until a correlation value between the template and the observation image exceeds a threshold value. A specific example of S414 will be described later. The computing unit 133 specifies a defect position (referred to as defect position C) in an EDS analysis process according to the result of S414 (S415). The control unit 131 and the computing unit 133 perform the EDS analysis on the specified defect position (S416). That is, the specified defect position is irradiated with an electron beam (third electron beam) for the EDS analysis.

(FIG. 4: Step S417)

The control unit 131 unloads the wafer from the charged particle beam device 11. The computing unit 133 stores necessary data such as an EDS analysis result in the storage unit 132.

Figure 5:
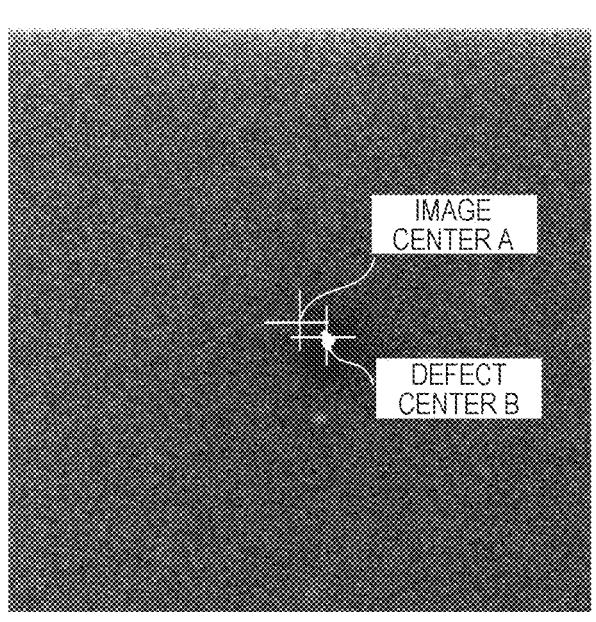
FIG. 5 illustrates an example showing a specific example of S409.

FIG. 5 is an example illustrating a specific example of S409. A defect center B exists at a position slightly shifted from a center A of the high magnification observation image acquired at the low acceleration voltage. The computing unit 133 calculates an offset $(Xo, Yo)=(Xb-Xa, Yb-Ya)$ from the center A $(Xa, Ya)$ to the defect center B $(Xb, Yb)$, and stores the result in the storage unit 132 as the defect position. As a result, the defect position has been specified with the center A of the high magnification observation image as a reference.

When acquiring the high magnification observation image, by irradiating a relatively narrow region (first region) on the sample with the electron beam, contamination may occur due to impurities adhering to that region. Whether contamination occurs depends on the irradiation density of the electron beam, but in Embodiment 1, it is assumed that the electron beam is emitted with an irradiation density having a degree to which contamination occurs. Then, it can be said that the center A of the high magnification observation image is also the center of the contamination region. In Embodiment 1, the defect position in the EDS analysis is specified by using this fact.

Figure 6A:
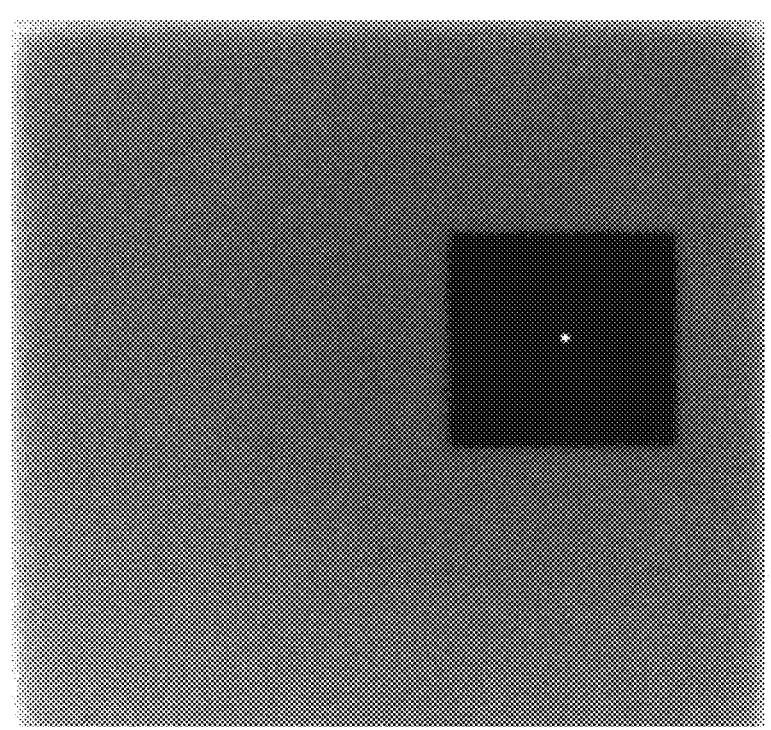
FIG. 6A illustrates an example of a low magnification observation image for EDS generated in S413.

FIG. 6A is an example of a low magnification observation image for EDS generated in S413. It is assumed that contamination occurs in the region (first region) irradiated with the electron beam when obtaining the high magnification observation image in S408. In FIG. 6A, this region corresponds to a black square region on the right side of the image. In S414, the computing unit 133 attempts to specify this contamination region.

Figure 6B:
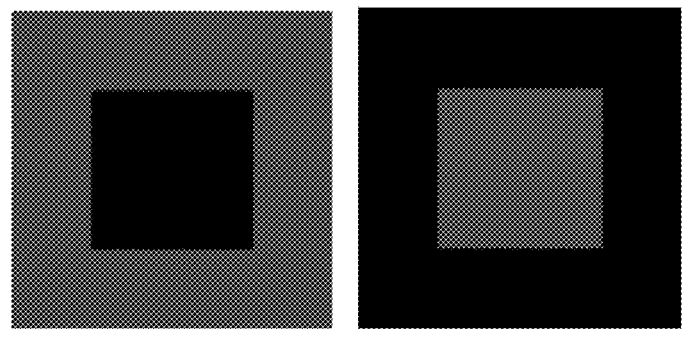
FIG. 6B illustrates an example of a template used by a computing unit 133 in S414.

FIG. 6B is an example of a template used by the computing unit 133 in S414. The contamination region appears as a region where a brightness value is different from the surroundings in the observation image. Therefore, the computing unit 133 attempts to specify the contamination region using two types of templates in which gradations of brightness values are inverted. When the brightness value of the peripheral region is relatively high and the brightness value of the contamination region is relatively low, the template on the left side of FIG. 6B is used. When the brightness value of the peripheral region is relatively low and the brightness value of the contamination region is relatively high, the template on the right side of FIG. 6B is used. By using two types of templates having different brightness values, a contamination region caused by various contamination causes can be specified. The template may be of any type other than the two types described with reference to FIG. 6B, as long as the contamination region can be accurately specified.

A detailed procedure for specifying the contamination region using the template illustrated in FIG. 6B in S414 will be described below.

(Step S414: Detailed Procedure Part 1)

The computing unit 133 specifies a pixel size of the contamination region according to the correlation between an actual size of a field of view (FOV) in S408 and an actual size of the FOV in S413. For example, according to the difference in FOV size between S408 and S413, it is possible to specify how much pixel size that size appears in S413.

(Step S414: Detailed Procedure Part 2)

The computing unit 133 creates a template that is slightly larger (for example, twice the size) than the determined size of the contamination region. For example, two types of templates illustrated in FIG. 6B can be created. The created template is stored in the storage unit 132.

(Step S414: Detailed Procedure Part 3)

When acquiring the low magnification observation image in S406, a frame-shaped region is formed in the outer peripheral portion of the FOV with electron beam irradiation. The cause is the same as contamination. This frame is observed as a white frame surrounding the outer periphery of the low magnification FOV on the observation image. In particular, since the end portion of the white frame has a shape similar to the contamination region, there is a possibility that it may be misrecognized as the contamination region in template matching. Therefore, the computing unit 133 sets only the region inside the white frame as a search region for pattern matching.

(Step S414: Detailed Procedure Part 4)

The computing unit 133 searches for a location that matches each template within a search range determined in the procedure part 3. For example, if the correlation value between a pixel value of the template and a pixel value of a search position is greater than or equal to a threshold value, it is determined that the search position matches the template. As a result, the center $(Xc, Yc)$ of the contamination region can be specified. $(Xc, Yc)$ is assumed to coincide with the center A $(Xa, Ya)$ of the high magnification observation image.

(Step S414: Detailed Procedure Part 5)

The computing unit 133 can calculate the defect position $(Xe, Ye)$ in the EDS process by adding the offset $(Xo, Yo)$ to the center $(Xc, Yc)$ of the contamination region: $(Xe, Ye)=(Xc+Xo, Yc+Xo)$.

(Step S414: Supplement about the Detailed Procedure)

Although not illustrated, in addition to the template matching described above, the position of the contamination region may be specified by the following method: template matching of X/Y projection waveform; template matching using a portion of a figure or waveform; peak position detection of differential waveform; and the like.

Figure 7:
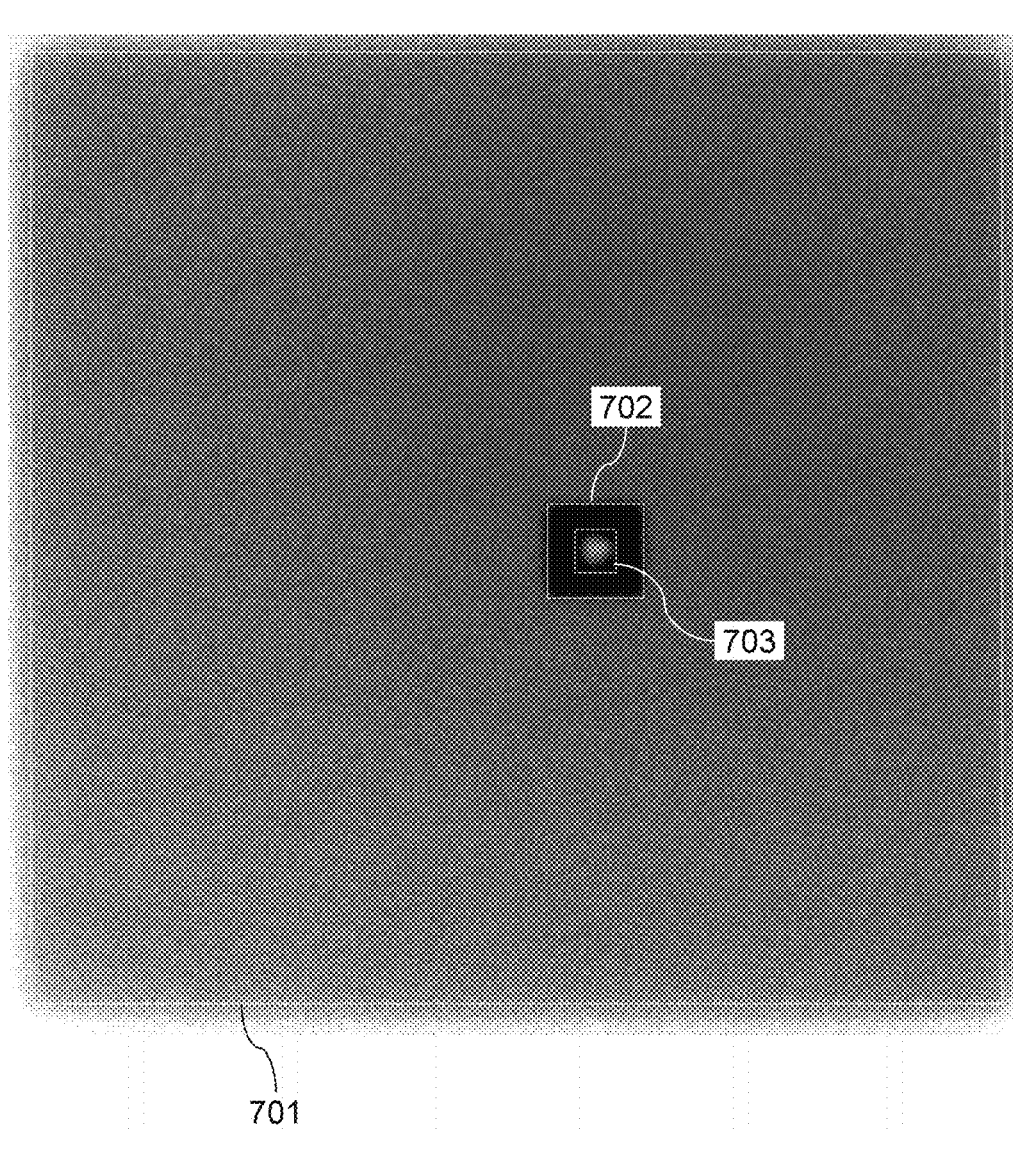
FIG. 7 illustrates an example of a user interface presented by a computer system 13.

FIG. 7 is an example of a user interface presented by the computer system 13. The user interface can be displayed on a screen on the operation terminal 136 (that is, it can be presented as a graphical user interface: GUI). The user interface control unit 135 can present at least one of the following information on the user interface, for example: (a) region 701 specified as the low magnification FOV region in S414, (b) high magnification FOV region (or contamination region) 702 specified in the low magnification observation image, (c) defect region 703 in the low magnification observation image, (d) result of the EDS analysis on the defect, (e) low magnification observation image itself, and (f) high magnification observation image itself.

Embodiment 1: Summary

The inspection apparatus 1 according to Embodiment 1 specifies the defect position within the high magnification FOV using the electron beam emitted at the low acceleration voltage for observation (first electron beam having first landing energy), and then obtains a low magnification FOV image (second electron beam image) using the electron beam emitted at the high acceleration voltage for EDS analysis (second electron beam having second landing energy). By specifying the position of the high magnification FOV region within the low magnification FOV image, the defect position therein is further specified. As a result, even if the high acceleration electron beam is transmitted through the defect, the defect position can be specified under high acceleration conditions via the defect position specified using the low acceleration electron beam. Similarly, even if the defect cannot be identified on the observation image due to contamination, the defect position thereof can be specified under high acceleration conditions via the defect position specified using the low acceleration electron beam.

Embodiment 2

In Embodiment 1, it has been described that contamination occurs on the sample 113 when obtaining the observation image at the low acceleration voltage. Whether contamination occurs depends on the irradiation density of the electron beam, and the higher the irradiation density, the higher the possibility of occurrence. Especially, during high magnification observation, the irradiation density increases, and thus contamination is easily generated. On the other hand, if the irradiation density of the electron beam is low and no contamination occurs (or the degree of contamination is low) even during high magnification observation, instead of specifying the contamination region in S414, it is necessary to specify the correspondence between the coordinates of defect in S408 and the coordinates of defect in the EDS process by another means. In Embodiment 2 of the present disclosure, one example thereof is described. Since the configuration of the inspection apparatus 1 is the same as that of Embodiment 1, the differences in the inspection procedure are mainly described below.

Figure 8:
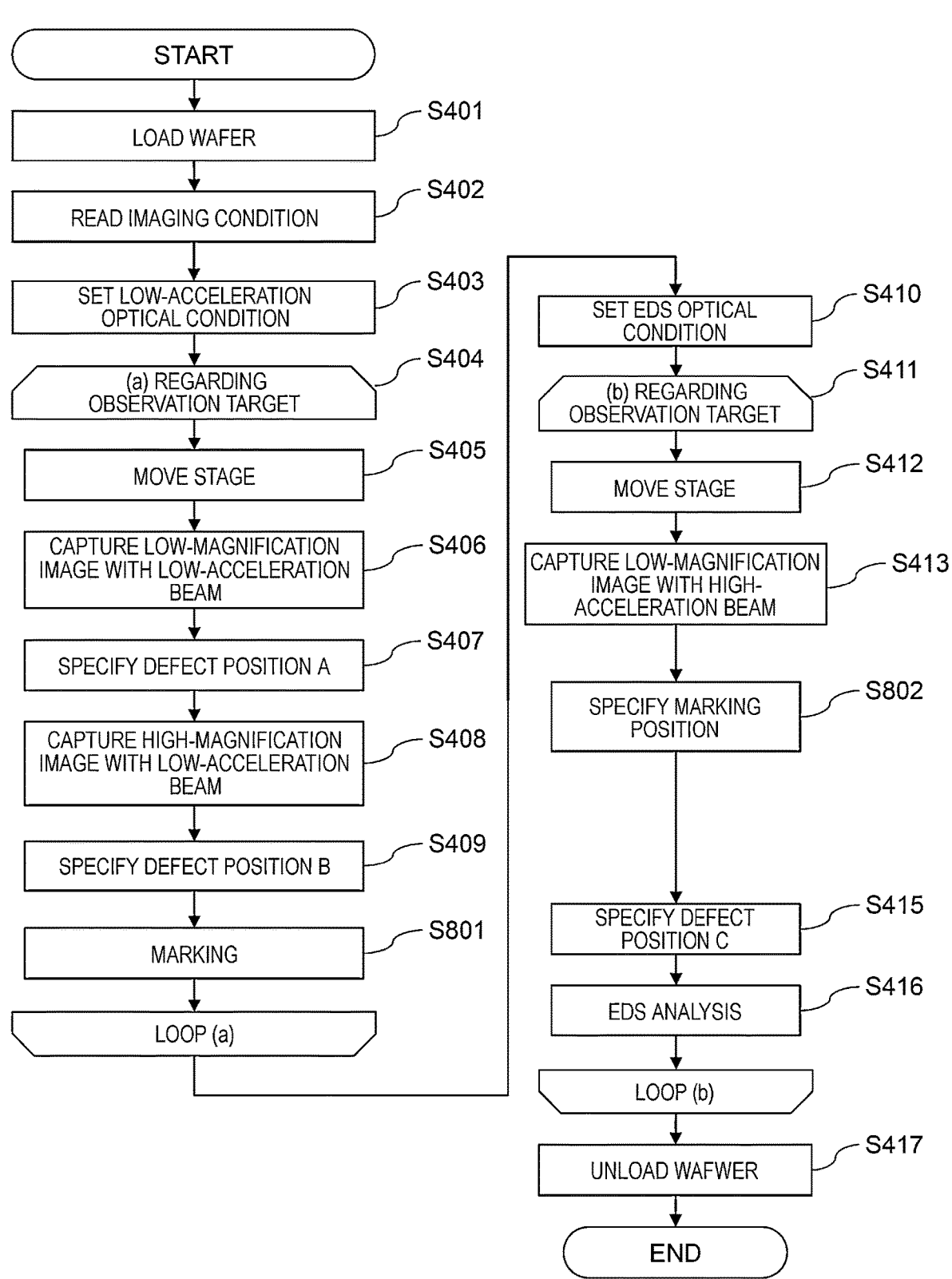
FIG. 8 is a flowchart illustrating a procedure in which the inspection apparatus 1 inspects the sample 113 in Embodiment 2.

FIG. 8 is a flowchart illustrating a procedure in which the inspection apparatus 1 inspects the sample 113 in Embodiment 2). Description of the same steps as in FIG. 4 is omitted. In FIG. 8, S801 is executed after S409, and S802 is executed instead of S414. The others are the same as in FIG. 4.

(FIG. 8: Step S801)

The control unit 131 performs marking on an appropriate location near the FOV in S408 using an electron beam having increased irradiation density. In order to increase the irradiation density, for example, the following steps may be taken: (a) reducing the size of the irradiation region; (b) irradiating the same irradiation position with the electron beam multiple times; and the like.

(FIG. 8: Step S802)

The computing unit 133 specifies a marking position in S801. For example, if a specific shape is marked in S801, the marking position can be specified by searching for that shape by pattern matching or the like. Other appropriate methods may also be used. In S415, the defect position C can be specified according to the relative relationship between the center coordinates in S408 and the marking position.

Figure 9:
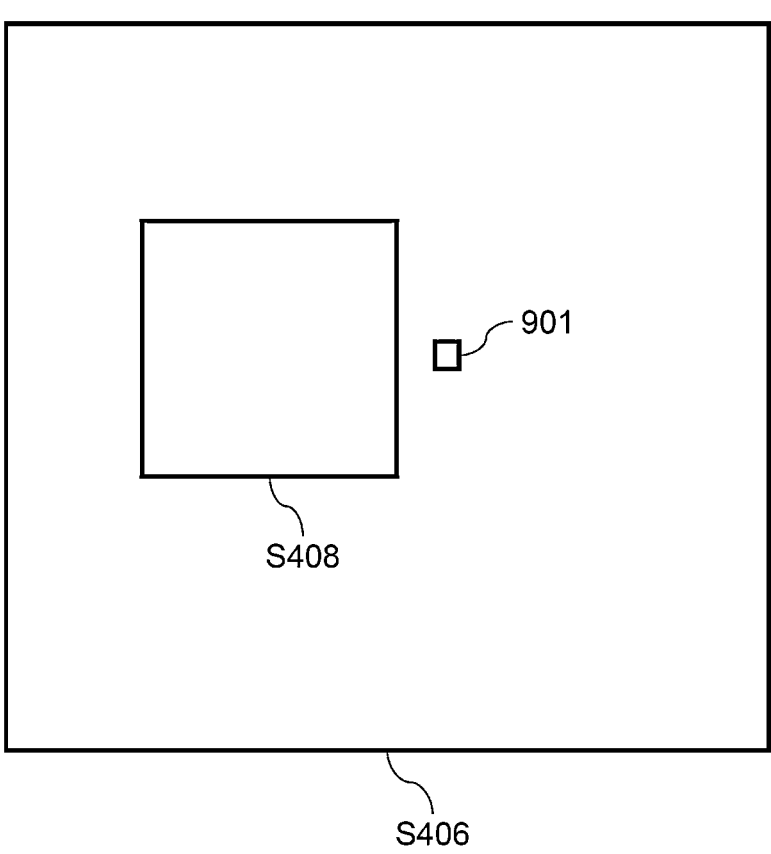
FIG. 9 illustrates an example of a marking.

FIG. 9 illustrates an example of a marking. The low magnification observation image in S406 includes the high magnification observation image in S408. A marking 901 is provided near the FOV of the high magnification observation image. According to the relative relationship between the position of the high magnification FOV and the position of the marking 901, the defect position C can be specified with the position of the marking 901 as a reference. The respective positions of the low magnification FOV/high magnification FOV/marking 901 as illustrated in FIG. 9 may be presented on a user interface provided in the computer system 13.

A shape of the marking 901 is preferably square in view of ease of formation. However, other shapes may be used as long as the position can be specified through computation processing. If the marking 901 and the defect overlap, a defect component cannot be accurately analyzed, and thus it is necessary to form the marking 901 at least outside the defect. Since specifying an exact position and shape of the defect at the time of forming the marking 901 requires a corresponding computational load, it is more desirable to form the marking 901 outside the high magnification FOV region.

FIG. 10 is an example of the user interface presented by the computer system 13 in Embodiment 2. In addition to the GUI described in Embodiment 1, the computer system 13 may provide a GUI for giving instructions to the inspection apparatus 1, as illustrated in FIG. 10. For example, as an EDS analysis mode, an instruction can be given so as to switch between a spot analysis mode in which a component analysis is performed on a specific spot and a scan analysis in which a component analysis is performed over a certain area range. In addition, whether to implement the method of identifying the contamination region described in Embodiment 1, whether to implement the marking described in Embodiment 2, and the like may also be designated. The size of the marking 901 may also be designated. The computer system 13 controls the charged particle beam device 11 according to designated inputs and performs an inspection process. A similar GUI may be presented in Embodiment 1 as well.

Embodiment 2: Summary

The inspection apparatus 1 according to Embodiment 2 forms the marking 901 around the high magnification FOV and specifies the defect position under high acceleration conditions with the marking 901 as a reference when it is assumed that the amount of contamination generated by emitting the low acceleration electron beam is less than the threshold value (for example, when the irradiation density of the electron beam is relatively low because the defect size is large). Consequently, even when the contamination position is difficult to specify, the defect position in the EDS process can be specified as in Embodiment 1.

<Regarding Modifications of the Present Disclosure>

The present disclosure is not limited to the embodiments described above, and includes various modifications. For example, the embodiments described above have been described in detail in order to explain the present disclosure in an easy-to-understand manner, and are not necessarily limited to those having all the configurations described. A part of the configuration of an embodiment can be replaced with the configuration of another embodiment, and a configuration of another embodiment can be added to the configuration of an embodiment. Further, for a part of the configuration of each embodiment, other configurations can be added, deleted or replaced.

In the embodiments described above, the charged particle beam device 11 can also be configured separately from the inspection apparatus 1. That is, the inspection apparatus 1 may be configured to receive a detection signal of the secondary particle or its digital value from the charged particle beam device 11 disposed outside the inspection apparatus 1, and use the signal and the value to generate an observation image.

In the embodiments described above, the control unit 131, the computing unit 133, and the user interface control unit 135 can be configured by hardware such as a circuit device implemented with these functions, or can be configured by a computing device such as a central processing unit (CPU) executing software implemented with these functions.

REFERENCE SIGNS LIST

1: inspection apparatus
11: charged particle beam device
12: communication line
13: computer system
131: control unit
132: storage unit
133: computing unit
134: input/output unit
135: user interface control unit
136: operation terminal

The invention claimed is:

1. An inspection apparatus that inspects a defect of a sample using an image obtained by irradiating the sample with an electron beam, the apparatus comprising:
a computer system that generates the image using a result of detecting secondary particles generated from the sample by irradiating the sample with the electron beam, wherein
the computer system irradiates a first region including the defect on the sample with a first electron beam having first landing energy and then generates a second electron beam image obtained by irradiating a second region of the sample including the first region with a second electron beam having second landing energy higher than the first landing energy,
the computer system specifies a position of the first region in the second electron beam image by using information representing the position of the first region, and
the computer system determines an irradiation position of a third electron beam for performing an element analysis on the defect in the first region based on the specified position of the first region.

2. The inspection apparatus according to claim 1, wherein
the computer system generates a first electron beam image obtained by irradiating the first region with the first electron beam,
the computer system specifies a position of the defect in the first electron beam image, and
the computer system determines the irradiation position of the third electron beam using the position of the defect in the first electron beam image and the position of the first region within the second electron beam image.

3. The inspection apparatus according to claim 2, wherein
the computer system generates, as the first electron beam image, an image that includes contamination that occurs in the first region by irradiating the first region with the first electron beam, and
the computer system specifies the position of the first region within the second electron beam image by specifying a position of the contamination within the second electron beam image.

4. The inspection apparatus according to claim 3, wherein
the computer system includes a storage unit that stores a template image representing a shape of the contamination,
the computer system acquires the information representing the position of the first region by searching for a location that matches the template image in the second electron beam image, and
the computer system specifies the position of the first region within the second electron beam image according to the information obtained by searching using the template image.

5. The inspection apparatus according to claim 4, wherein
the storage unit stores, as the template image, two types of images of
a first template having a rectangular region that has a first brightness value and a peripheral region that surrounds the rectangular region and has a second brightness value, and
a second template in which a gradation of the first template is inverted, and
the computer system searches for a location that matches at least one of the first template and the second template in the second electron beam image.

6. The inspection apparatus according to claim 4, wherein
the computer system specifies an outer periphery of the second region by identifying a frame shape formed on the outer periphery of the second region in the first electron beam image, and
the computer system performs a search using the template image only inside the specified second region.

7. The inspection apparatus according to claim 1, wherein
the computer system generates, as the second electron beam image, an image including a marking formed on the sample by irradiating the sample with a fourth electron beam having a higher irradiation density than the first electron beam,
the computer system acquires the information representing the position of the first region by searching for the marking in the second electron beam image, and
the computer system specifies the position of the first region within the second electron beam image according to the information obtained by searching using the marking.

8. The inspection apparatus according to claim 7, wherein
the computer system generates, as a first electron beam image obtained by irradiating the first region with the first electron beam, an image obtained when contamination generated in the first region by irradiating the first region with the first electron beam is less than a threshold value, and
the computer system specifies the position of the first region within the second electron beam image without depending on the position of the contamination by searching for the marking in the second electron beam image.

9. The inspection apparatus according to claim 7, wherein the marking is square and formed outside the first region.

10. The inspection apparatus according to claim 1, wherein the computer system includes a user interface that presents at least one of the specified position of the first region, the position of the first region within the second electron beam image, the position of the defect in the second electron beam image, a result of performing the element analysis on the position of the defect, and the second electron beam image.

11. The inspection apparatus according to claim 1, wherein the sample is a wafer or bare wafer on which no pattern is formed.

12. An inspection method for inspecting a defect of a sample using an image obtained by irradiating the sample with an electron beam, the method comprising:

a step of generating the image using a result of detecting secondary particles generated from the sample by irradiating the sample with the electron beam, wherein the step of generating the image includes a step of irradiating a first region including the defect on the sample with a first electron beam having first landing energy and then generating a second electron beam image obtained by irradiating a second region of the sample including the first region with a second electron beam having second landing energy higher than the first landing energy, the step of generating the image includes a step of specifying a position of the first region in the second electron beam image by using information representing the position of the first region, and the step of generating the image includes a step of determining an irradiation position of a third electron beam for performing an element analysis on the defect in the first region based on the specified position of the first region.

* * * * *